United States Patent
Earl

(10) Patent No.: US 9,495,124 B1
(45) Date of Patent: Nov. 15, 2016

(54) DEVICE FOR DISPLAYING A REMOTE DISPLAY ACCORDING TO A MONITOR GEOMETRY

(75) Inventor: Michael Earl, Lindon, UT (US)

(73) Assignee: Crimson Corporation, Dover, DE (US)

( * ) Notice: Subject to any disclaimer, the term of this patent is extended or adjusted under 35 U.S.C. 154(b) by 201 days.

(21) Appl. No.: 13/526,193

(22) Filed: Jun. 18, 2012

(51) Int. Cl.
*G09G 5/00* (2006.01)
*G06F 3/14* (2006.01)

(52) U.S. Cl.
CPC .................................. *G06F 3/1423* (2013.01)

(58) Field of Classification Search
CPC ................ G09G 2300/026; G09G 2300/023; G06F 3/1446; G06F 3/04897; G06F 3/1423
USPC ..................................................... 345/2.1, 3.4
See application file for complete search history.

(56) References Cited

U.S. PATENT DOCUMENTS

| | | | |
|---|---|---|---|
| 5,923,307 A * | 7/1999 | Hogle, IV | G06F 3/04897 345/1.3 |
| 8,743,019 B1 * | 6/2014 | Eng | 345/1.1 |
| 2008/0068290 A1 * | 3/2008 | Muklashy et al. | 345/2.1 |
| 2009/0044128 A1 * | 2/2009 | Baumgarten | G06F 17/30905 715/738 |
| 2009/0262084 A1 * | 10/2009 | Yu | G06F 1/14 345/173 |
| 2011/0063315 A1 * | 3/2011 | Ghosh | 345/536 |
| 2012/0162889 A1 * | 6/2012 | Han | G06F 1/162 361/679.09 |

* cited by examiner

*Primary Examiner* — Andrew Sasinowski
*Assistant Examiner* — Brent D Castiaux
(74) *Attorney, Agent, or Firm* — Austin Rapp & Hardman

(57) ABSTRACT

A computing device that is configured to coordinate a remote display is described. The computing device includes a processor and instructions stored in memory. The computing device establishes a remote session corresponding to a node. The computing device also obtains a monitor geometry corresponding to two or more remote display devices. The computing device further maps the monitor geometry to a virtual display space. The computing device further displays at least a part of the virtual display space.

18 Claims, 9 Drawing Sheets

US 9,495,124 B1

DEVICE FOR DISPLAYING A REMOTE DISPLAY ACCORDING TO A MONITOR GEOMETRY

TECHNICAL FIELD

The present disclosure relates generally to computers and computer-related technology. More specifically, the present disclosure relates to a device for displaying a remote display according to a monitor geometry.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Many computers may be connected to such networks. These computers are often referred to as nodes. One or more servers or computers may provide data, services and/or may be responsible for managing other computers on the network. A computer network may include hundreds or even thousands of nodes.

Computers may often communicate over a network. For example, a computer may view files or data on a node or remote device over a network. In some cases, viewing files over a network may result in some difficulty in transferring data between different devices. As can be observed from this discussion, systems and methods that assist in viewing and effectively transferring data over a network may be beneficial.

DETAILED DESCRIPTION

Figure 1:
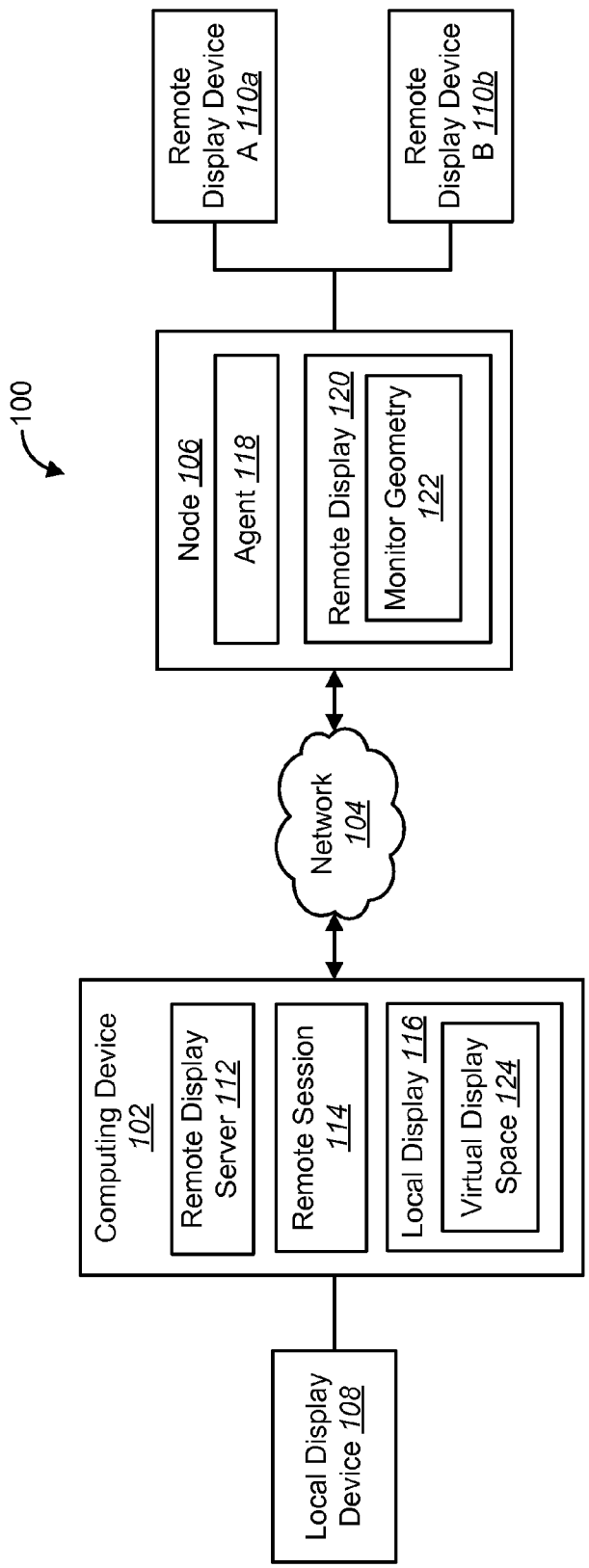
FIG. 1 is a block diagram illustrating one configuration of a system where systems and methods for a device for displaying a remote display according to a monitor geometry may be implemented.

A computing device configured to coordinate a remote display is described. The computing device includes a processor and instructions stored in memory that is in electronic communication with the processor. The computing device establishes a remote session corresponding to a node. The computing device also obtains a monitor geometry corresponding to two or more remote display devices. The computing device also maps the monitor geometry to a virtual display space. The computing device also displays at least a part of the virtual display space.

The monitor geometry may include a physical orientation of two or more remote display devices. The monitor geometry may also include a resolution setting of at least one of two or more remote display devices.

The computing device may also determine a present display corresponding to two or more remote display devices. The computing device may also map the present display to the virtual display space. The computing device may also display a portion of the virtual display space corresponding to the present display of the virtual display space.

The computing device may determine a new present display space based on a change in the present display space. The computing device may also map the new present display space to the virtual display space. The computing device may also display a portion of the virtual display space corresponding to the new present display space. Determining a new present display space based on a change in the present display space may include determining that an indicator on the present display space moves between a first and second display space on one or more remote display devices.

A method for coordinating a remote display is also described. The method includes establishing a remote session corresponding to a node. The method also includes obtaining a monitor geometry corresponding to two or more remote display devices. The method also includes mapping the monitor geometry to a virtual display space. The method also includes displaying at least a part of the virtual display space.

A non-transitory tangible computer-readable medium for coordinating a remote display is also described. The computer-readable medium includes executable instructions for establishing a remote session corresponding to a node. The computer-readable medium also includes executable instructions for obtaining a monitor geometry corresponding to two or more remote display devices. The computer-readable medium also includes executable instructions for mapping the monitor geometry to a virtual display space. The computer-readable medium also includes executable instructions for displaying at least a part of the virtual display space.

The systems and methods disclosed herein describe approaches for displaying a remote display according to a monitor geometry. There is often a need to replicate the display of a remote device over a network. Remote controlled devices may have one or more display devices that are arranged in a variety of ways. For example, arrangement of monitors may be horizontal or vertical. Further, resolution settings and other display settings may be different between different devices. Where multiple displays are being used, replicating the geometry presents some difficulties if the arrangement, resolution, and/or other display settings are different from the display of a corresponding controlling device.

In attempting to simulate a remote display, some difficulties arise where a remote controlling device does not know how remote devices are arranged. In some approaches, a remote controlling device attempts to simulate a remote display by guessing how the remote displays are arranged or using default settings without knowing any specifics about the geometry of the remote display. However, where a user or controlling device guesses in an attempt to simulate a remote display, the replica of the remote display will often not use the same monitor geometry of the remote devices.

In some known systems, a controlling device will replicate a remote display by spanning a screen to include one or more monitors all on the same display device. However, when compressing multiple screens to the same display, some applications may become difficult, particularly where it would be useful to view a remote display similarly to how it is displayed on the remote device.

In an effort to remedy some of these difficulties, the systems and methods disclosed herein provide an approach for displaying a remote display according to a monitor geometry. For example, to facilitate a more accurate replication of a remote display on a local device, a computing device may map and/or coordinate a monitor geometry of a remote display with a display space to be displayed on a local device. The geometry may include data about the physical display on the remote device providing information to the computing device to better replicate the remote display according to the geometry of the remote display.

The systems and methods described herein may provide more accurate renderings of remote displays, and be useful in a number of different applications. By displaying a remote session as it would appear on the remote device, the computing device may simulate or perform operations and tasks on the remote device and display the results of those operations and tasks as if displayed on the remote device itself. Further, creating a physically accurate display may be useful in a variety of applications, such as teaching, providing Information Technology (IT) help and other applications where an accurate replication of a display is useful.

In the following description, several terms will be used to describe certain aspects of mapping a remote display and displaying a representation of a remote display on a local display device. As a brief explanation, a display may refer to data on a computing device that may be used to generate and/or create a representation of the display on a display device. A display device may be a physical device, separate or attached to a computing device or node that may be utilized by a computing device to physically represent a display. A display space may include a virtual representation of what is to be displayed by a display device. A display may be segmented into several display spaces, with one or more display spaces being represented on one or more display devices. A computing device may instruct a display device to switch between display spaces changing the visual representation of a display. A present display space may include all or a portion of a display space that is currently represented on a display device. A computing device may further define a present display space using various criteria to correspond to some or all of a display space.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system 100 where systems and methods for a device for displaying a remote display according to a monitor geometry 122 may be implemented. A computing device 102 and one or more nodes 106 may be connected to a network 104. The computing device 102 and nodes 106 may be implemented as servers, personal computers (PCs), mobile devices or other kinds of computing devices. The computing device 102 may include a remote display server 112, a remote session 114 and a local display 116. The remote display server 112 may be a hardware and/or software module used to establish and/or manage a remote session 114 between the computing device 102 and a node 106. In one example, the computing device 102 establishes a remote session 114 corresponding to a node 106 in which the computing device 102 may perform on behalf of the node 106 or cause the node 106 to perform certain operations without being at the same physical location as the node 106.

The computing device 102 may communicate with a node 106 over a network 104. The network 104 may be a computer network such as a Local Area Network (LAN), Wide Area Network (WAN), Internet, Intranet, or other medium for transferring data between various devices. In various configurations, any number of devices, including computing devices, nodes and display devices may be connected to the network 104. In some configurations, a remote session 114 may be hosted over the network 104 and used for obtaining information about a remote display 120, including obtaining monitor geometry 122 from a node 106.

The computing device 102 may also include a local display 116. The local display 116 may include information about one or more displays, display spaces and/or display devices corresponding to the computing device 102. In some configurations, the local display 116 may include resolution information, settings, monitor specifications, and/or other data related to the display. In some configurations, the computing device 102 may obtain display information related to a node 106 over the network 104 and provide and/or maintain the information as part of the local display 116. The local display 116 may also include and/or obtain information from a virtual display space 124. The virtual display space 124 may include information about a remote display 120, including information about the physical characteristics of a remote display 120.

The computing device 102 may also include one or more local display devices 108. A local display device 108 may be coupled to and/or in electronic communication with the computing device 102. In some configurations, a local display device 108 may be physically connected to or mounted to the computing device 102. In some configurations, a local display device 108 may communicate with the computing device 102 wirelessly or over a network. The computing device 102 may communicate with one or more local devices 108 using a variety of configurations. In some configurations, the computing device 102 may store and/or maintain information about the local display device 108 as part of the local display 116. Some examples of local display devices 108 may include a monitor, mobile device, touchscreen or other device that provides an interface or projects a display. In some configurations, the local display device 108 may include any suitable image projection technology, such as a cathode ray tube (CRT), liquid crystal display (LCD), light-emitting diode (LED), gas plasma, electroluminescence or the like. In some configurations, the computing device 102 may include any number of local display devices 108.

One or more nodes 106 may be in communication with the computing device 102 over the network 104. In some configurations, the node 106 may include an agent 118. The agent 118 may include hardware and/or software installed or otherwise implemented by the computer device 102 and/or node 106. The agent 118 may be configured to receive and process instructions from the computing device 102 and/or interact with the remote display server 112. For example, the agent 118 may be installed on a node 106 to interface with the remote display server 112 and receive and process instructions regarding the remote session 114 and/or remote display 120. In some configurations, the agent 118 may be configured to perform many of the same processes described herein with relation to the computing device 102.

The node 106 may further include a remote display 120. The remote display 120 may include information about multiple displays, display spaces and/or display devices corresponding to the node 106 and/or the remote session 114. In some configurations, the remote display 120 may include resolution information, settings, specifications and other information related to the display. In some configurations, the remote display 120 may obtain and/or maintain display information related to the node 106 and provide display information to a computing device 102.

In some configurations, the remote display 120 includes a monitor geometry 122 corresponding to one or more remote display devices 110a-b. The monitor geometry 122 may include information related to the physical appearance the remote display 120 as shown on multiple remote display devices 110. For example, the monitor geometry 122 may include the physical configuration (e.g., orientation, positioning, etc.) of one or more remote display devices 110. The monitor geometry 122 may also include resolution or display settings corresponding to one or more remote display devices 110. In some configurations, the monitor geometry 122 may include the physical orientation of the monitors as viewed by the node 106. In another configuration, the monitor geometry 122 may include dimensions or size information corresponding to one or more remote display devices 110. In another configuration, the monitor geometry 122 may include the segmentation of the remote display 120, including how a display is portrayed across multiple monitors. The node 106 may also maintain a display space corresponding to the physical appearance of the remote display 120. Additionally or alternatively, the monitor geometry 122 may include information regarding a number of remote display devices 110, one or more placement relationships between remote display devices 110 (e.g., whether the remote display devices 110 are placed side-by-side, above or below each other, diagonally from each other, in a grid formation, etc.) and/or whether each display device 110 is physically placed in portrait, landscape or some other orientation, etc.

In some configurations, the node 106 may include one or more remote display devices 110 that are coupled to and/or in electronic communication with the node 106. In some configurations, the remote display devices 110 may be physically connected to and/or mounted on the node 106. In other configurations, the node 106 may communicate with some or all of the display devices 110 remotely or over a network. Other examples may include other configurations for communication between the node 106 and one or more remote display devices 110.

In some configurations, the remote display 120 corresponding to one or more display devices 110 may include a monitor geometry 122 corresponding to each display device 110. In some configurations, the monitor geometry 122 may include information about the physical appearance of the remote display 120 as would be shown on a display space corresponding to one or more display devices 110. In another configuration, the monitor geometry 122 may include information about the physical appearance of part or all of the entire remote display 120 as it spans across multiple display devices 110. In one example, the monitor geometry 122 may include information about the physical appearance of segmented portions of the remote display 120 as it corresponds to the one or more remote display devices 110.

In one example, the node 106 may include remote display device A 110a and remote display device B 110b. Remote display device A 110a and remote display device B 110b may configured in a vertical orientation with respect to each other. Other orientations may be used, and may include any number of display devices. The node 106 may include information about the vertical orientation of the display devices 110a-b and store and/or maintain the orientation information as part of the monitor geometry 122 of the remote display 120. The computing device 102 may obtain some or all of the monitor geometry 122 corresponding to the remote display 120 for use in rendering a corresponding image or display on a local display device 108.

Figure 2:
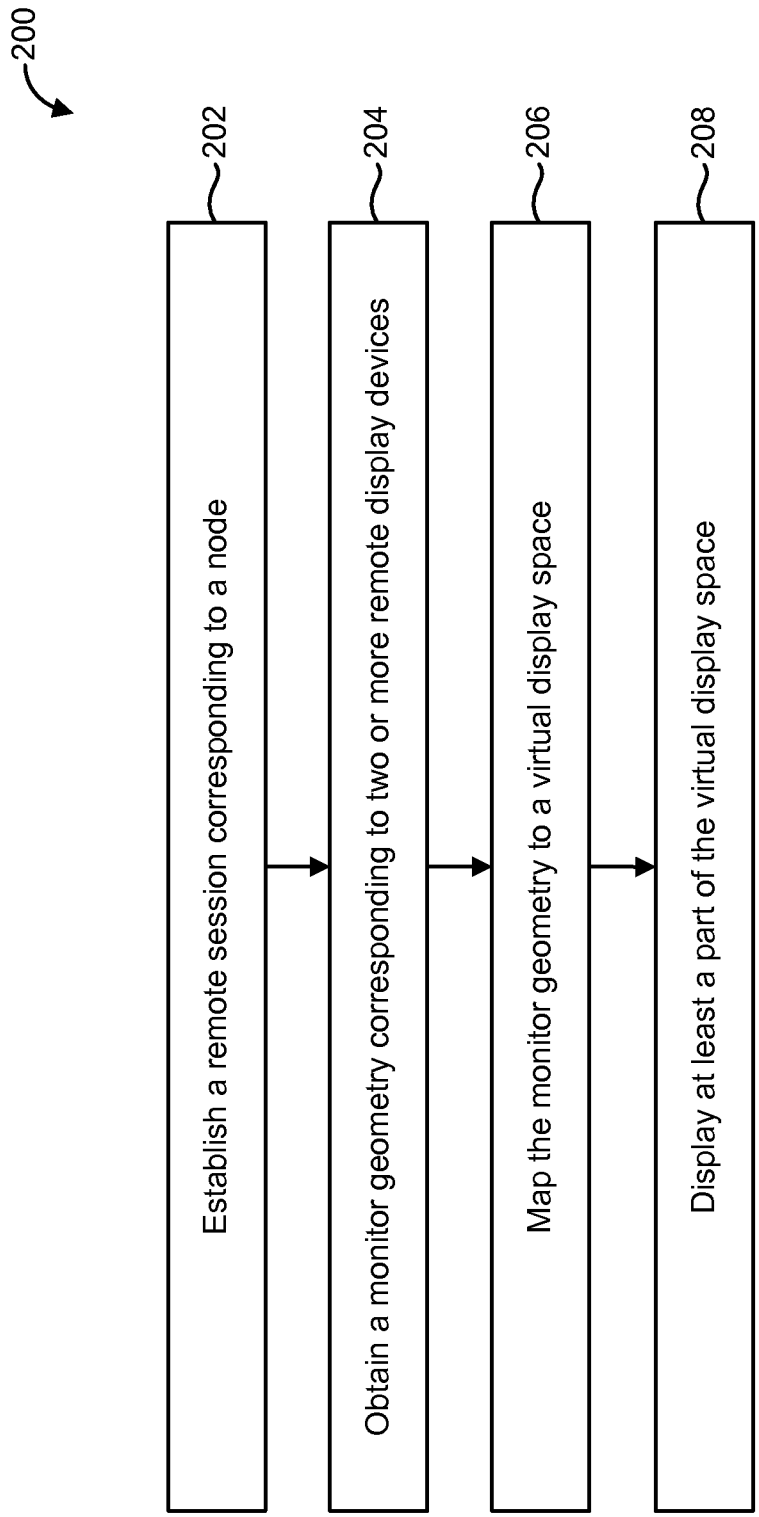
FIG. 2 is a flow diagram illustrating one configuration of a method for displaying a remote display according to a monitor geometry.

FIG. 2 is a flow diagram illustrating one configuration of a method 200 for displaying a remote display 120 according to a monitor geometry 122. In one configuration, a computing device 102 establishes 202 a remote session 114 corresponding to a node 106. In one configuration, establishing 202 a remote session 114 permits a computing device 102 to perform certain operations and processes on a node 106 or on behalf of a node 106 without being physically present at the node 106. In other words, the computing device 102 may establish 202 a remote session in order to remotely control the node 106. For example, in a remote session 114 corresponding to a node 106, the computing device 102 may instruct the node 106 to delete, create, move, update, execute, install, download, display or to perform other processes as instructed by the computing device 102. In some configurations, a computing device 102 may obtain various types of information about a node 106 over a remote session 114. In one example, the computing device 102 may obtain data related to a remote display 120 corresponding to the node 106.

The computing device 102 may also obtain 204 a monitor geometry 122 corresponding to two or more display devices 110. In one configuration, the monitor geometry 122 may be any information related to the physical appearance of the remote display 120 on one or more remote display devices 110. In some configurations, the monitor geometry 122 may include data about one or more remote display devices 110 corresponding to the node 106. For example, remote display device A 110a may include certain dimensions and resolution settings known to the node 106. Remote display device B 110b may also include similar or different dimension and resolution settings to remote display device A 110a. One or more remote display devices 110 may include other settings and display data corresponding to each respective display device 110. The monitor geometry 122 may include this and other information corresponding to remote display device A 110a and remote display device B 110b. The monitor geometry 122 may enable the computing device 102 to be informed as to the physical orientation and other display data corresponding to one or more remote display devices 110. The computing device 102 may obtain a monitor geometry 122 corresponding to one or more remote display devices 110 from an operating system on the computing device 102 and/or from the node 106 corresponding to one or more remote display devices 110. Additionally or alternatively, the computing device 102 may obtain the monitor geometry 122 corresponding to one or more remote display devices 110 from an input (e.g., user input) provided to the computing device 102.

The monitor geometry 122 may also include data related the orientation of one or more corresponding remote display devices 110. For example, in a configuration where remote display device A 110a and remote display device B 110b are positioned horizontally with respect to each other, the monitor geometry 122 may include data related to the physical orientation from the perspective of the node 106. For example, the monitor geometry 122 may indicate to a node 106 that moving a cursor to the right on a display space corresponding to a local display device A 110a will be shown to move between display device A 110a to display device B 110b from left to right. The monitor geometry 122 may include other data related to the physical orientation, including overlapping areas between one or more display devices 110, the physical relationship between each remote display device 110 and information related to the segmentation of the display between one or more remote display devices 110.

In some configurations, the computing device 102 may map 206 the monitor geometry 122 to a virtual display space 124. In some configurations, mapping 206 the monitor geometry 122 may include enabling a computing device 102 to access the monitor geometry 122 over the remote session 114. In some configurations, the computing device 102 may access other display data corresponding to the remote display 120. In some configurations, the computing device 102 may instruct the node 106 to map the monitor geometry 122 to a virtual display space 124 by sending instructions to an agent 118 instructing the agent 118 to transmit or make the monitor geometry 122 and/or other display information available to the computing device 102. In some configurations, the computing device 102 may map the monitor geometry 122 to a virtual display space 124 by accessing or directing the node 106 to transmit the monitor geometry 122 to a virtual display space 124.

In some configurations, the virtual display space 124 may include a representation of the remote display 120 in a virtual space. In one example, the local display 116 may include a virtual display space 124 that corresponds to a remote display 120 including the monitor geometry 122 and other data related to the remote display 120. The computing device 102 may be configured to create the virtual display space 124 according to the physical characteristics of the remote display 120 provided by the monitor geometry 122. In one configuration, the virtual display space 124 may include display settings, resolution settings and other data related to the remote display 120. Further, the virtual display space 124 may include data related to the display settings, resolution settings and other data displayed on one or more remote display devices 110.

In some configurations, the virtual display space 124 may include orientation data related to the positioning of or more remote display devices 110a-b. For example, the virtual display space 124 may include a representation of the data displayed on one or more remote display devices 110 in a similar physical orientation as each of the remote display devices 110. In one example, where remote display A 110a and remote display B 110b are oriented in a horizontal orientation, the virtual display space 124 may include the remote display 120 in a horizontal configuration.

The virtual display space 124 may also include data related to the segmentation of the remote display 120 and/or corresponding display spaces. For example, where a node 106 includes multiple remote display devices 110a-b, the virtual display space 124 may include multiple and/or segmented display spaces corresponding to each of the multiple remote display devices 110a-b. In one example, the node 106 includes remote display device A 110a and remote display device B 110b which may display a remote display space segmented into two parts. When mapping the monitor geometry 122 to a virtual display space 124, the resulting virtual display space 124 may include information from the monitor geometry 122 about the segmentation of the remote display 120, including information about how the remote display 120 is displayed on both remote display device A 110a and remote display device B 110b.

The computing device 102 may also display 208 at least a part of the virtual display space 124. The virtual display space 124 may correspond to the mapped monitor geometry 122 of the remote display 120. In some configurations, the virtual display space 124 may be displayed according to some or all of the properties of the monitor geometry 122 of the remote display 120. In one example, the virtual display space 124 on the local display 116 may correspond to the physical appearance of the remote display 120 as would be shown on one or more display devices 110a-b. For example, the local display 116 may display some or all the virtual display space 124 on a local display device 108 that corresponds to a similar configuration, resolution, orientation, segmentation and/or other appearance attributes of the remote display 120. In some configurations, the local display device 108 may display some or all of the virtual display space 124 to correspond to a remote display device 110 according to the monitor geometry 122 mapped to the virtual display space 124.

In some configurations, a virtual display space 124 may be obtained to correspond with one or more display spaces on the node 106. A display space may include data related to a display and how it would appear on a corresponding remote display device 110 and/or local display device 108. For example, in some configurations, each of the remote display devices 110 may include one or more corresponding display spaces that may include data from the remote display 120. Each display space may be obtained by the computing device 102 for creating and/or obtaining the virtual display space 124. In a remote session 114, a remote display 120 may be partially portrayed on a display space without physically displaying anything on the remote display device 110. In one configuration, the computing device 102 may display some or all of the virtual display space 124 on a display space corresponding to a local display device 108.

In one example, the computing device 102 has a single corresponding local display device 108. Other configurations may include additional local display devices. The node 106 includes remote display device A 110*a* and remote display device B 110*b*. Other configurations of the node 106 may include any number or remote display devices 110. In one example, the monitor geometry 122 corresponding to display spaces on remote display device A 110*a* and remote display device B 110*b*, respectively, may be mapped to a virtual display space 124 and displayed on the local display device 108. In this example, the computing device 102 may display a portion of the virtual display space 124 corresponding to remote display device A 110*a* on a local display device 108. Also, the monitor geometry 122 may indicate that remote display device A 110*a* and remote display device B 110*b* are oriented vertically, with remote display device A 110*a* being physically positioned above remote display device B 110*b*. Further, in this and other examples, a cursor and/or other indicator of the virtual display space 124 corresponding to the display space of remote display device A 110*a* may move downward across a portion of the virtual display space 124 as displayed on the local display device 108. When the cursor and/or other indicator moves downward, the computing device 102 may recognize a point, line and/or region that indicates a switching point of the remote display 120 between display spaces corresponding to remote display device A 110*a* and remote display device B 110*b*. In some examples, when movement of a cursor and/or other indicator indicates a switch between remote display device A 110*a* and remote display device B 110*b* according to the monitor geometry 122, the computing device 102 may be configured to recognize the switch and change the corresponding display space on the local display device 108. For example, if the location of the cursor and/or other indicator on the virtual display space 124 crosses a switch point on the virtual display space 124 corresponding to a switch point between remote display device A 110*a* and remote display device B 110*b*, the computing device 102 may also switch a display space of the local display device 108 to reflect the change between the remote display devices 110 on the remote session 114. Other configurations and methods for displaying the virtual display space 124 may be implemented.

Figure 3:
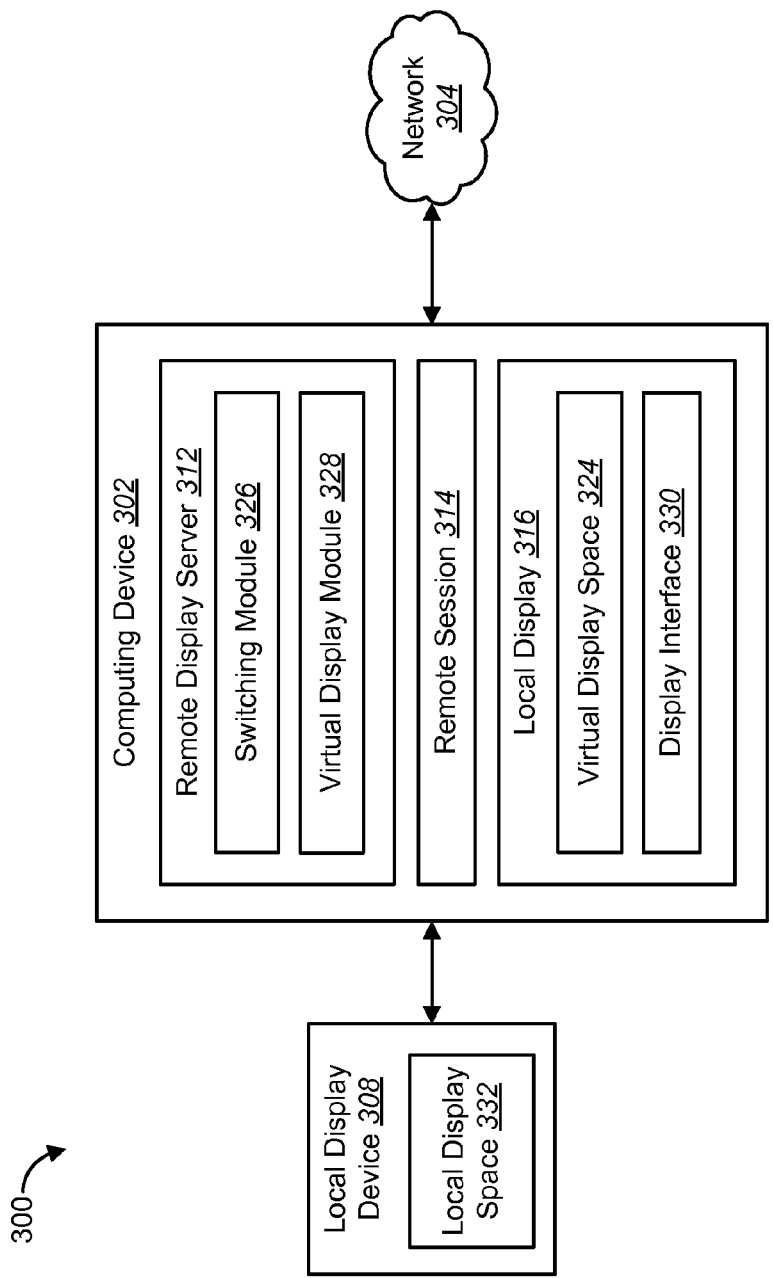
FIG. 3 is a block diagram illustrating a more detailed configuration of a system where systems and methods for a device for displaying a remote display according to a monitor geometry may be implemented.

FIG. 3 is a block diagram illustrating a more detailed configuration of a system 300 where systems and methods for a device for displaying a remote display according to a monitor geometry may be implemented. The system 300 includes a computing device 302 participating in a remote session 314 over a network 304. The computing device 302 may include a remote display server 312, a remote session 314 and a local display 316. The computing device 302 may also include a local display device 308 with a local display space 332. In some configurations, the remote display server 312 may include a switching module 326 and a virtual display module 328. In one example, the local display 316 may include a virtual display space 324 and a remote display interface 330. In some configurations, the computing device 302 may include more or less elements than those described herein. FIG. 3 will be described in greater detail below together with FIG. 4.

Figure 4:
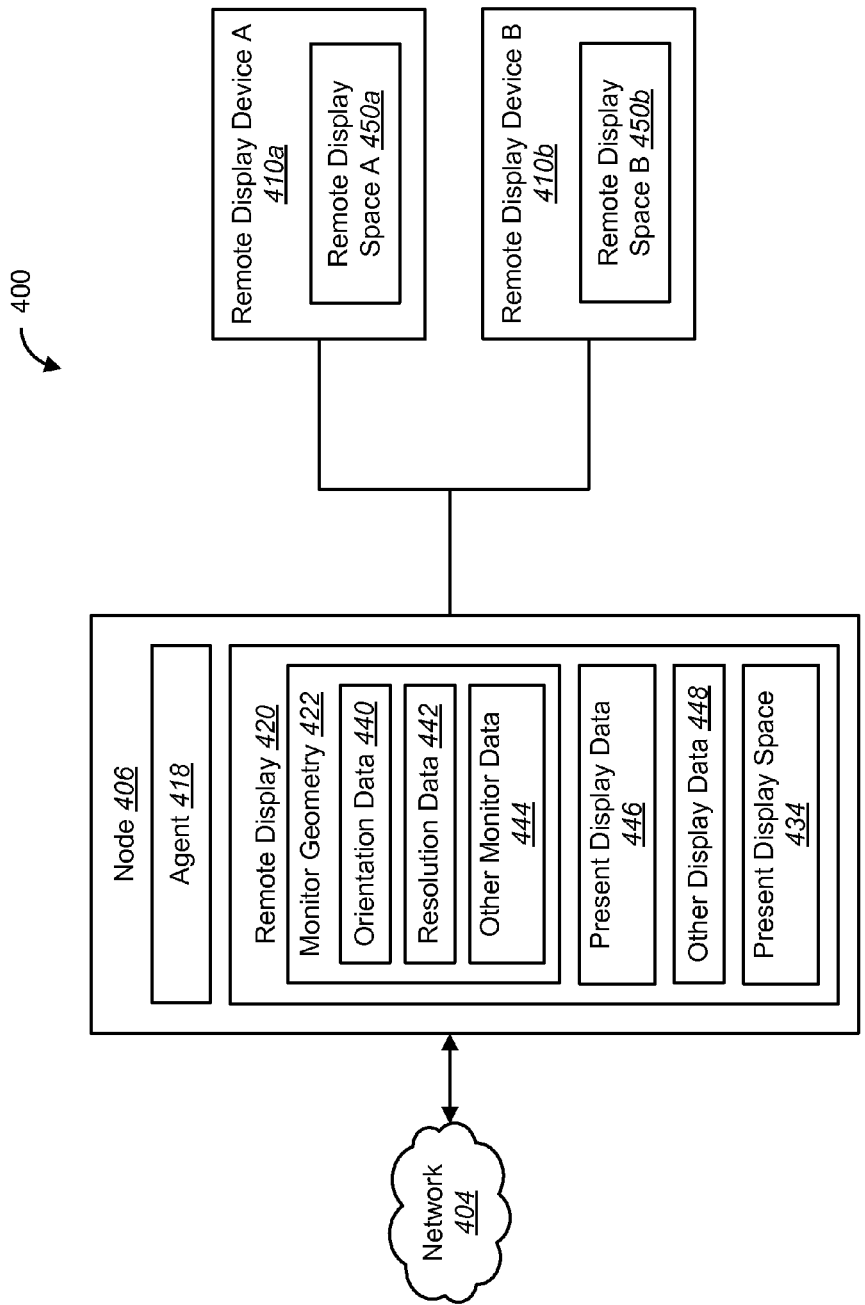
FIG. 4 is a block diagram illustrating one configuration of a system where systems and methods for a device for displaying a remote display according to a monitor geometry may be implemented.

FIG. 4 is a block diagram illustrating one configuration of a system 400 where systems and methods for a device for displaying a remote display 420 according to a monitor geometry 422 may be implemented. The system 400 may include a node 406 participating in a remote session 314 over a network 404. In some configurations, the node 406 may include an agent 418 and a remote display 420. The node 406 may further include one or more corresponding display devices 410*a-b*. In one example, the node 406 includes remote display device A 410*a* with a corresponding remote display space A 450*a*. The node 406 may also include remote display device B 410*b* with a corresponding remote display space B 450*b*. The remote display 420 may include a monitor geometry 422. The monitor geometry 422 may include various data related to the physical appearance of the remote display 420. In one example, the monitor geometry 422 may include orientation data 440, resolution data 442 and other monitor data 444. The remote display 420 may also include a present display space 434, present display data 446 and other display data 448 related to the remote display 420. FIG. 4 will be described in greater detail below with relation to FIG. 3.

The remote display server 312 may include one or more hardware and/or software modules for establishing and or managing a local display 316 corresponding to one or more display devices 410 of a remote session 314. Further, the remote display server 312 may include similar elements to other remote display servers described herein. In one configuration, the remote display server 312 may include a switching module 326 and a virtual display module 328. In some configurations, the switching module 326 may manage and/or instruct the local display 316 as shown on the local display device 308 to correspond to one or more remote display devices 410. Additionally or alternatively, the virtual display module 328 may obtain and/or generate a virtual display space 324, including attributes obtained from a monitor geometry 422.

In some configurations, the switching module 326 may manage a local display space 332 corresponding to the local display device 308. In some configurations, the switching module 326 may obtain data from a node 406 with multiple remote display devices 410 regarding a display space 450 and/or present display space 434 of a remote display 420. In some configurations, a present display space 434 may correspond to a display space linked to a specific display device. For example, where a cursor and/or other indicator is located on a portion of a display space, that display space may be a present display space 434. Further, when the cursor and/or other indicator is moved from a first display space corresponding to a first display device to a second display space corresponding to a second display device, the present display space 434 may switch from the first display space to the second display space. In some configurations, the switching module 326 may change the local display space 332 to correspond with a present display space 434 of the remote display 420.

In some configurations, the virtual display module 328 may manage a virtual display space 324 and other information associated with the local display 316. In one example, the virtual display module 328 may obtain and/or generate a virtual display space 324 corresponding to a monitor geometry 422 of a remote display 420. The virtual display module 328 may also coordinate with the local display 316 the display space to be displayed corresponding to a portion of the virtual display space 324. In one example, the virtual display module 328 may coordinate with a switching module 326 to obtain a display space where a portion of a virtual display space 324 corresponds to a present display space 434 of the remote display 420. For example, in one configuration, the switching module 326 may determine that the present display space 434 has switched from remote display space A 450*a* to remote display space B 450*b*. The virtual display module 328 may determine a portion of the virtual display space 324 corresponding to the new present display space 434 and provide and/or indicate a portion of a virtual display space 324 to display on the local display device 308 corresponding to the present display space 434 of the remote display 420.

The computing device 302 may further include a local display 316 containing various information about what to display on one or more local display devices 308. In one configuration, the local display 316 includes a virtual display space 324. The virtual display space 324 may be obtained and/or created by the computing device 302 to be a display space corresponding to a present display space 434 and/or one or more remote display spaces 450. The virtual display space 324 may be a representation of multiple display spaces 450, including various types of display data related to the remote display 420. For example, the virtual display space 324 may include various characteristics of a monitor geometry 422 corresponding to a remote display 420. Some characteristics provided by the monitor geometry 422 may include orientation data 440, resolution data 442 and other monitor data 444 that may be used in obtaining and/or creating a virtual display space 324 with similar characteristics to one or more remote display spaces 450. In some configurations, the virtual display space 324 may include data about the segmentation of one or more remote display spaces 450, including boundaries between monitors and other data for accurately displaying a portion of the virtual display space 324 on the local display device 308.

The local display 316 may also include a display interface 330. In some configurations, the display interface 330 may assist in the coordination of a local display space 332 to a corresponding remote display space 450. In one example, the display interface 330 may include selectable options for switching between display spaces and/or changing a present display space 434. In one example, the display interface 330 may include an overlay to show switch points and/or threshold regions between one or more remote display spaces 410 and display these switch points or threshold regions on a local display space 332 of the local display device 308. In one example, the display interface 330 may include an overlay or display of some or all of the virtual display space 324, including correlations between the virtual display space 324 and one or more remote display spaces 450. In one configuration, the display interface 330 may provide one or more indications on the local display space 332 of the monitor geometry 422 and/or other information related to the remote display 420, including physical characteristics of the display 420 as they would appear on one or more remote display devices 410.

The computing device 302 may include a local display device 308 with a corresponding local display space 332. In some configurations, the local display device 308 is controlled by the computing device 302 and provided content to display from a local display 316 held and/or maintained in the local display 316. In some configurations, the computing device 302 may include multiple local display devices 308 with corresponding display spaces 332. In some configurations, where the computing device 302 includes multiple local display devices 308, the remote display server 312 may coordinate which portions of a virtual display space 324 to display on which local display device. In one example, one or more of the local display spaces 332 corresponding to one or more local display devices 308 may always correspond to a single remote display device 410. In the same example, the remote display server 312 may cause one or more other local display spaces 332 corresponding to other local display devices 308 to switch or change to correspond with one or more remote display spaces 450 or different portions of a virtual display space 324.

A node 406 may include an agent 418. The agent 418 may include a hardware and/or software module used to receive and/or process instructions from a computing device 302. In some configurations, the agent 418 may obtain and/or process data related to a monitor geometry 422 of one or more display devices 410. In some configurations, the agent 418 may be configured to perform some of the processes discussed in relation to the computing device 302 and the remote display server 312. In some configurations, the agent 418 may be configured to interact with the computing device 302 and/or remote display server 312 over a network 404 including providing instructions and/or data related to the remote display 420 and other data as needed and/or instructed for displaying a remote display 420 according to a monitor geometry 422.

The node 406 may include a remote display 420. The remote display 420 may include information about one or more display devices 410a-b and/or display spaces 450a-b corresponding to the node 406. In some configurations, the remote display 420 may include information about the physical appearance of one or more display devices 410 and other data related to the remote display 420. In some configurations, the remote display 420 may store and/or maintain information about the display devices 410 and/or corresponding display spaces 450 for use by an agent 418 and/or the computing device 302. In some configurations, data from the remote display 420 may be mapped to the computing device 302 for efficient access to data related to the remote display 420.

In some configurations, the remote display 420 may include a monitor geometry 422. The monitor geometry 422 may include information corresponding to the physical appearance or one or more display devices 410 and/or display spaces 450. For example, in one configuration, the monitor geometry 422 may include orientation data 440 related to the orientation of one or more remote display devices 410. The physical orientation may include whether one or more display devices 410 are horizontally, vertically or otherwise oriented as viewed by the node 406. The orientation data 440 may include information about directions between display spaces 450, including switch points or threshold areas where the present display changes between display devices 410. The orientation data 440 may include other information about the orientation of the remote display device 410 and/or remote display spaces 450 corresponding to one or more remote display devices. In some configurations, the monitor geometry 422 may include orientation data 440 on some or all of the remote display devices 410 and/or remote display spaces 450 corresponding to a node 406.

The monitor geometry 422 may include resolution data 442 related to the resolution of one or more display devices 410 and/or corresponding display spaces 450. The resolution data 442 may include different resolution settings for each corresponding display device 410 and/or corresponding display space 450. In some configurations, the computing device 302 may be configured to change the resolution of a local display device 308 based on resolution data 442 corresponding to a present display space of a corresponding remote display device 410. In some configurations, the monitor geometry 422 may include other monitor data 444 related to the physical appearance or settings of one or more remote display devices 410 and corresponding display spaces 450. In some configurations, other monitor data 444 may include various types of information which may be mapped to a virtual display space 324 and contribute to the physical appearance of a local display space 332 as it would appear on a local display device 308.

In some configurations, the remote display 420 may include present display data 446 related to a current view of the remote display 420. For example, the computing device 302 and/or node 406 may determine a present display space 434 based on a variety of factors from the present display data 446 that indicate which display device 410 and/or display space 450 is currently in use. In some configurations, the present display data 446 correspond to multiple display devices 410 and/or display spaces 450. In one example, the present display space 434 may be determined by obtaining present display data 446 indicating which display space 450 has displayed the most recent activity, such as movement of a cursor or a change of data in the remote display 420 that corresponds to a specific remote display device 410. Present display data 446 may include settings, preferences, cursor information and other data for indicating a present display space 434 corresponding to some or all of a virtual display space 324 to be displayed on a local display device 308. In one example, the present display space 446 may be split between multiple remote display spaces 450.

In some configurations, the remote display 420 may include other display data 448. In some cases, other display data not directly related to the physical appearance or present display of one or more display devices may be mapped to a virtual display space 324 on the computing device 302 for a more accurate or efficient reproduction of one or more display spaces 450. Other display data 448 may include data related to the appearance, settings, specifications and other data related to the remote display 420 and portraying the remote display on one or more remote display devices 410 and/or corresponding remote display spaces 450.

The node 406 may include one or more remote display devices 410a-b. Each display device 410 may include a corresponding remote display space 450. In one example, the node 406 includes remote display device A 410a with a corresponding remote display space 450a. The node 406 may also include remote display device B 410b with a corresponding remote display space 450b. In other examples, the node 406 may include any number of remote display devices 410, each with one or more corresponding display spaces 450. In some configurations, remote display device A 410a and remote display device B 410b may be oriented in a variety of ways. In one configuration, remote display device A 410a and remote display device B 410b may have a vertical configuration, with remote display device A 410a being positioned above remote display device B 410b. Other configurations may be used. In another example, one or both remote display devices 410a-b may be rotated sideways, resulting in a shortened or elongated display space 450 from the perspective of the node 406. In some configurations, one or more remote display devices 410 may have similar settings and/or configurations.

Each of the display devices 410 may include one or more corresponding display spaces 450. In one example, the computing device 302 and/or node 406 may designate one or more display spaces 450 as a present display space 434. In some configurations, the computing device 302 may determine a present display space 434 that corresponds to some or all of the virtual display space 324. In some configurations, the computing device 302 may display a subset of the virtual display space 324 on a local display device 308 that corresponds to the present display space 434 as determined by the computing device 302 and/or node 406.

In some configurations, a computing device may obtain preference data on how the mapping and/or rendering of the remote display is implemented. For example, in one configuration, a computing device 302 may generate a user interface (UI) that provides one or more properties of a remote monitor geometry (e.g., physical orientation of monitors, switching and threshold preferences, physical dimensions, etc.) to view on a local display device 308. Further, the UI or other interface may provide optional mapping preferences that may be selected or applied to a local display 316. One example of a preference may include whether to switch between display spaces automatically or whether to wait for an input command. In another example, a local display device 308 may be configured to display an overlay or fade between display spaces. Other mapping and/or display preferences may include other options for how to display a virtual display space and/or how to transition between one or more display spaces on one or more local display devices. In some configurations, preferences may be obtained before or during establishment of a remote session 314. In other cases, preferences may be obtained or modified during a remote session 314.

Furthermore, mapping a monitor geometry 422 to a virtual display space 324 and displaying at least a portion of the virtual display space 324 may include a variety of other configurations. For example, in one configuration, the computing device 302 may display the virtual display space 324 on a local display device 308 to create a 1:1 approximation of a remote display 420 that includes a similar number of remote display devices 410 while possibly having a different orientation of the local and remote display devices. In another configuration, the local display 316 may map the monitor geometry 422 to best approximate the physical appearance of a remote display 420 notwithstanding a different number of local display devices 308 than remote display devices 410. In another configuration, one or more local display devices 308 may display the same portion of the virtual display space 324 while one or more other local display devices 308 may switch between portions of the virtual display space 324 corresponding to at least a portion of the remote display 420. In another configuration, one or more local display devices 308 may be configured to switch between portions of a virtual display space 324 whenever a change occurs in the present display space 434 of a remote display 420. In another configuration, one or more local display devices 308 may switch between portions of a virtual display space 324 in compliance with certain preferences obtained by the computing device 302. Other configurations may be applied in mapping a monitor geometry 422 to a virtual display space 324 and displaying at least part of the virtual display space 324 on a local display device 308.

Figure 5:
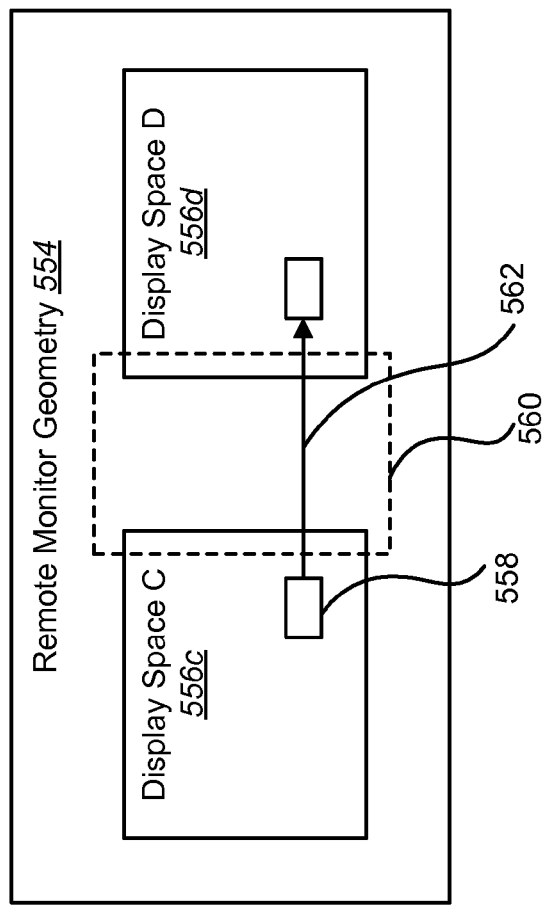
FIG. 5 is a block diagram illustrating one configuration of a system where systems and methods for a device for displaying a remote display according to a monitor geometry may be implemented.
Figure 5:

FIG. 5 is a block diagram illustrating one configuration of a system 500 where systems and methods for a device for displaying a remote display according to a monitor geometry may be implemented. Specifically, FIG. 5 illustrates one example of a local monitor geometry 552 and a remote monitor geometry 554. In some configurations, the local monitor geometry 552 and remote monitor geometry 554 may correspond to a local display and remote display and other elements described in other figures (e.g., FIGS. 3 and 4). In some configurations, the local monitor geometry 552 may correspond to the appearance of one or more local display devices 308. In one example, the local monitor geometry 552 includes display space A 556a and display space B 556b. In some configurations, a node may include a remote monitor geometry 554 with similar and/or different characteristics than the local monitor geometry 552. In one example, the remote monitor geometry 554 includes display space C 556c and display space D 556d. In some configurations, a computing device 302 may obtain and display a virtual display space 324 on local display spaces 556a-b to correspond to a remote monitor geometry 554.

In one example, the local monitor geometry 552 includes display space A 556a and display space B 556b in a vertical configuration with display space A 556a positioned on top of display space B 556b. The remote monitor geometry 554 may include display space C 556c and display space D 556d in a horizontal configuration with display space C 556c and display space D 556d next to each other. In one example, the local monitor geometry 552 may be configured by making display space A 556a correspond to display space C 556c and display space B 556b correspond to display space D 556D. In this and other configurations, the computing device 302 may display the remote monitor geometry 554 according to a monitor geometry 422 of a node 406 with a similar physical appearance to how it would actually appear on one or more remote devices 410.

In one example, the remote monitor geometry 554 may include a cursor 558 and/or data related to the cursor 558 that may move around one or more display spaces 556c-d. In some configurations, the cursor 558 may correspond with a present display space 434 that indicates which part and/or segment of a remote monitor geometry 554 is currently in use. In some configurations, the computing device 302 and/or node 406 may be configured to recognize a switch command 562 or other operation indicating a change of the present display space 434 between display space C 556c and display space D 556d. In some configurations, a switch may occur when a cursor 558 moves across or through a threshold area 560 between one or more display spaces 556c-d. For example, in a remote session 314, when a cursor 558 is currently on display space C 556c, display space C 556c may be designated as a present display space 434. In response, the computing device 302 may instruct a local display device 308 to display a portion of a virtual display space 324 corresponding to display space C 556c so long as display space C 556 remains designated as the present display space 434.

In another example, a local monitor geometry 552 may include less individual display spaces 556 than a remote monitor geometry 554. For example, in one configuration, the local monitor geometry 552 may include only display space A 556a while the remote monitor geometry 554 may include both display space C 556c and display space D 556d. In this example, the computing device 302 may instruct a local display device 308 to display a single display space corresponding to display space C 556c and/or display space D 556d depending on whether display space C 556c or display space D 556d is designated by the computing device 302 and/or node 406 as the present display space 434.

In another example, a local monitor geometry 552 may include display space A 556a and display space B 556b while the remote monitor geometry 554 includes display space C 556c and display space D 556d. In some configurations, the remote monitor geometry 554 may include one or more display spaces in addition to display space C 556c and display space D 556d. In one example, the computing device 302 may instruct a local display device 308 to display on display space A 556a a part of the virtual display space 324 that corresponds to display space C 556c. In a similar example, the computing device 302 may instruct display space B 556b to alternate between display space C 556c, display space D 556d and/or other display spaces according to a determination by the computing device 302 and/or node 406 which display space or group of display spaces represents a present display space 434.

In some configurations, the remote display 420 may include data related to a threshold area 560 between one or more display spaces. A threshold area 560 may be a line, point, region, boundary and/or other indicator between one or more display spaces indicating a transition between display spaces. In one example, a threshold area 560 may be a line, point, region or other indicator between display space C 556c and display space D 556d. When a cursor 558 crosses over a threshold area, the computing device 302 and/or node 406 may determine a new display space corresponding to the present display space 434. In one example, the computing device 302 may recognize a switch command 562 when a cursor 558 moves from display space C 556c to display space D 556d over a threshold area 560. In some configurations, the computing device 302 may determine that display space D 556d is a present display space 434 in response to the cursor 558 moving across the threshold region 560 into display space D 556d. In another example, the computing device 302 may recognize a switch command 562 when a cursor 558 moves across or into a threshold region 560 and recognizes a click or other input to indicate a switch between display spaces and/or between display spaces of a virtual display space 324.

In some configurations, the computing device 302 may present an overlay and/or icon on a local monitor geometry 552 when a cursor 558 or other icon passes into a threshold area 560. In one example, display space C 556c is positioned to the left of display space D 556d. When a cursor 558 is moved to the right and passes into a threshold area 560 towards display space D 556d, the computing device 302 may display an overlay and/or other display on a local display device 308 to indicate a potential change. In some configurations, the display interface 330 may present a visible notification and/or selectable option for switching between display space C 556c and display space D 556d. In one example where display space A 556a is configured to display a present display space, the computing device 302 may be configured to switch display space A 556a to correspond to display space D 556d when the cursor 558 passes through the threshold area 560. In some configurations, the computing device 302 may change the virtual display space 324 to correspond with a new present display depending on the direction and location of a cursor 558 in relation to one or more threshold regions. In some examples, the threshold area 560 may be located around the borders of each of the display spaces. Further, in some examples, the computing device 302 may recognize various directional commands based on the behavior of a cursor 558 and/or other indicator within a threshold area 560.

Additionally, the computing device 302 may present an overlay, icon and/or other indicator based on an acceleration or speed of a cursor 558 as it moves across a display space 556. When a computing device 302 recognizes a cursor 558 moving quickly and/or accelerating across a threshold area 560, the computing device 302 may scale a display space 556 to show and/or indicate where the cursor 556 resides on the remote monitor geometry 554. The computing device 302 may continue to display an overlay, icon, scaled portion or other indicator until the cursor 560 slows down, stops or clicks on a definitive display space 556 corresponding to a segmented portion of the remote monitor geometry 554. Once determined where the cursor 560 resides, the computing device 302 may remove the overlay, icon, scaled portion or other indicator and display the virtual display space 324 according to the remote monitor geometry 554.

Figure 6:
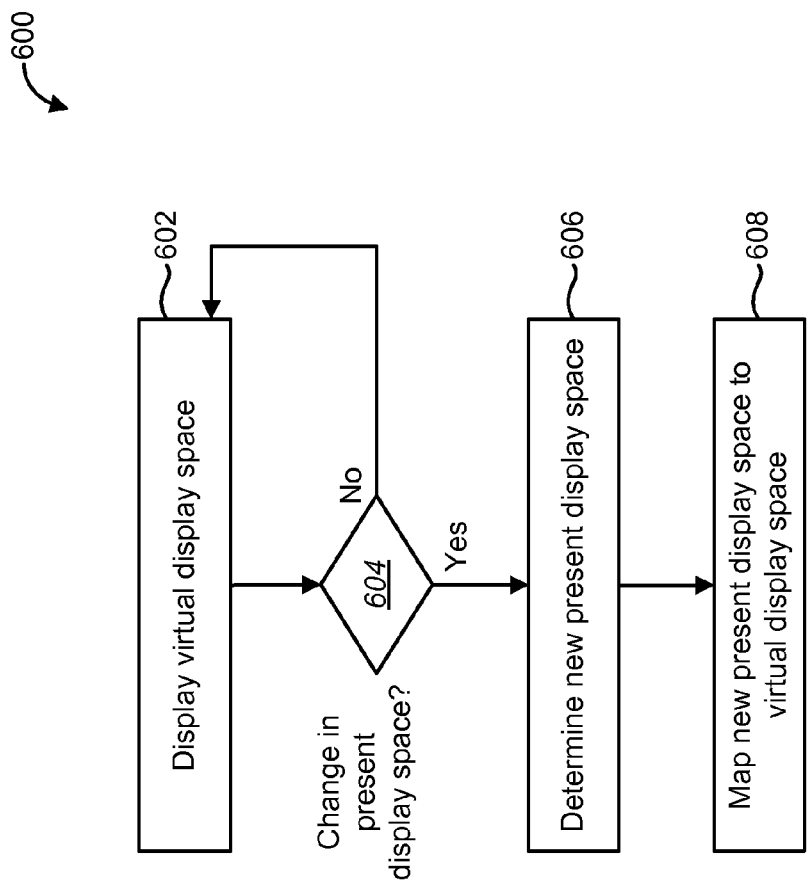
FIG. 6 is a flow diagram illustrating one configuration of a method for displaying a remote display according to a monitor geometry.

FIG. 6 is a flow diagram illustrating one configuration of a method 600 for displaying a remote display 420 according to a monitor geometry 422. In one configuration, the computing device 302 may display 602 a virtual display space 324. In some configurations, the virtual display space 324 may correspond to a remote display 420. In some examples, the virtual display space 324 may correspond to the monitor geometry 422 of one or more remote display devices 410 including the orientation, resolution and/or other physical aspects of the remote display 420. In one example, the computing device 302 may display a portion of the virtual display space 324 on a local display device 308 corresponding to a present display space 434 of the remote display 420. In one configuration, the present display space 434 may correspond to what would be displayed on one or more remote display devices 410 and/or one or more remote display spaces 450.

In some configurations, the computing device 306 may determine 604 if there is a change in the present display space 434 of the remote display 420. In some examples, determining whether a the present display space 434 has changed may include tracking a cursor or determining whether a monitor is currently in use or has been most recently used using a variety of factors. In one example, if remote display space A 450a is currently being used, then a computing device 306 may determine that remote display space A 450a is part of a present display space 434. In another configuration, the computing device 302 may designate a remote display space 450 currently being used as a present display space in addition to one or more adjacent display spaces. In some configurations, the number of remote display spaces 450 that are included in the present display space 434 may depend on the number of local display spaces 332 available. Further, the computing device 302 may use other factors in determining whether there is a change in a present display space 434.

If a computing device 302 determines that there is no change in the present display space 434, the computing device 302 may display some or all of the virtual display space according to previous settings and/or corresponding display spaces that make up the virtual display space 324. The computing device 302 may continue monitoring and/or observing whether there is a change in the present display space 434 that would merit performing future operations and/or processes. In one configuration, where a computing device determines that there is a change in the present display space 434, the computing device may determine 606 a new present display space 434. In some configurations, determining a new present display space 434 may include obtaining data from the remote display 420. In some configuration, the present display space 434 may be determined from monitor geometry 422, present display data 446, and/or other display data 448. Additionally or alternatively, other data for reproducing one or more remote display spaces 450 may be used in determining a new present display space 434.

The computing device 302 may also map 608 the new present display space 434 to a virtual display space 324. In some configurations, this may include obtaining or changing the existing virtual display space 324 to more closely resemble one or more display spaces on a remote display device 410. In some configurations, mapping 608 a present display space 434 to a virtual display space 324 may include tagging and/or designating one or more display spaces within the virtual display space 324 to represent the present display space 434 and be displayed on one or more local display devices 308. In some configurations, the virtual display space 324 may include the entire display area including all remote display spaces 450 corresponding to a node 406. The virtual display space 324 may also include a designated portion and/or flagged portion of the virtual display space 324 corresponding to the present display space 434. In some configurations, the computing device 302 may display a designated portion of the virtual display space 324 on a local display device 308 according to the monitor geometry 422 and other data corresponding to the remote display 420.

Figure 7:
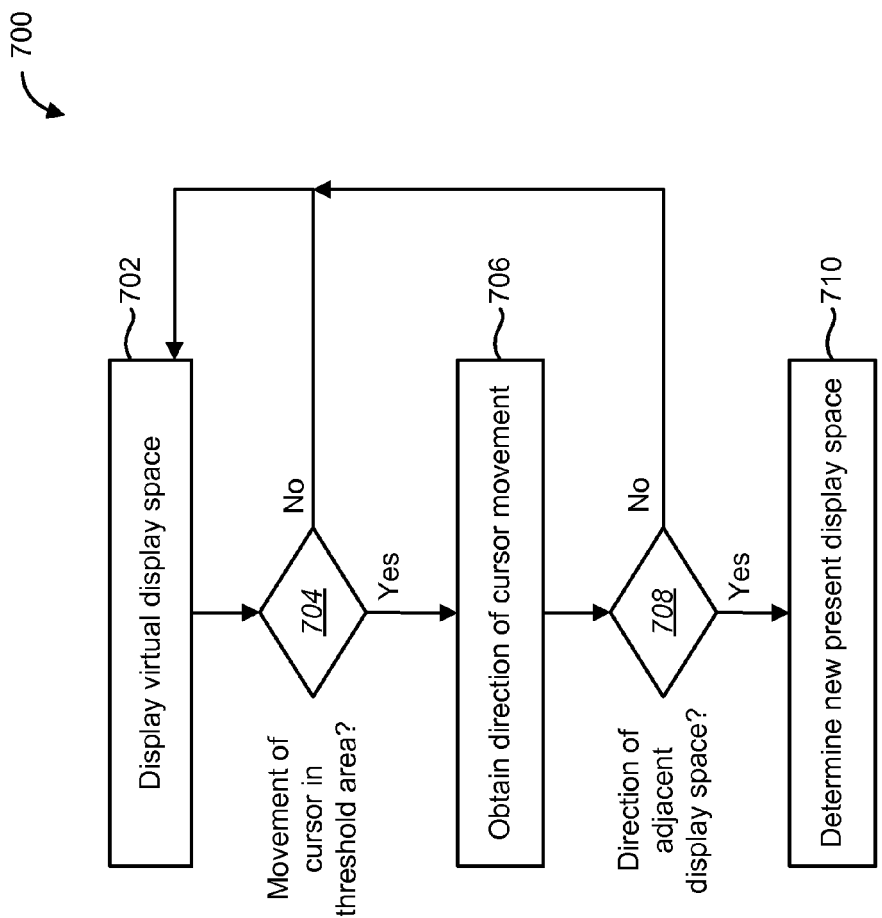
FIG. 7 is a flow diagram illustrating one configuration of a method for displaying a remote display according to a monitor geometry.

FIG. 7 is a flow diagram illustrating one configuration of a method 700 for displaying a remote display 420 according to a monitor geometry 422. In one configuration, the computing device 302 may display 702 a virtual display space 324. In some configuration, displaying 702 the virtual display space 324 may be performed by the computing device 302 similar to other configurations described herein. Additionally, the computing device 302 may display some or part of the virtual display space 324 on one or more local display devices 308 in a variety of ways to approximate the physical appearance of a remote display 420.

In some configurations, the computing device 302 may determine 704 whether there is movement of a cursor 558 is in a threshold area 560. In some configurations, a cursor 558 may include an input icon or other indicator that may be displayed on a display device. In one example, a cursor 558 may be controlled by a mouse, keyboard or other input device. Additionally, a remote display 420 may also include a threshold area 560 corresponding to an area or region between one or more display devices. In one configuration, the threshold region 560 may correspond to a space or region between adjacent display devices. Additionally or alternatively, the threshold area 560 may be a single line or boundary between one or more display spaces. In one example, where display space C 556c and display space D 556d are side by side horizontally with display space C 556c positioned to the left of display space D 556d, a threshold region 560 may be a region that spans between the right edge of display space C 556c and the left edge of display space D 556d. If it is determined that there is not a cursor in the threshold area 560, the computing device 302 may continue displaying a virtual display space 324 without further changes to the present display space 434.

The computing device 302 may also obtain 706 the direction of the cursor 558 movement. The direction of the cursor 558 movement may be obtained from a node 406 over a remote session 314. In some configurations, the direction may be obtained from an agent 418 in communication with the remote display server 312 and/or switching module 326. The direction of the cursor 558 movement may correspond to a movement command 560. A cursor command 560 may correspond to an input from a mouse, keyboard, and/or other input device. Furthermore, the computing device 302 may determine the direction of the movement of a cursor 558 based on a variety of factors.

In one configuration, the computing device 302 may determine 708 whether the direction of a cursor 558 movement is in the same or similar direction of an adjacent display space. In one example, a present display space may correspond to display space C 556c. In the same example, display space D 556d may be in an adjacent position to the right of display space C 556c. When a cursor 558 in display space C 556c moves into the threshold region 560 while moving in the direction of the adjacent display space D 556d, the computing device 302 may determine 710 a new present display space corresponding to display space D

556*d*. In some configurations, upon determining that the cursor is moving in the direction of an adjacent display space, the computing device 302 may display an overlay or selectable icon on a display interface 330 to indicate a possible switch between display spaces. In one configuration, the computing device 302 may be configured to determine a new present display space only when a cursor 558 moves in and out of a threshold area 560 moving in the direction of an adjacent display space. For example, where a cursor 558 is in display space C 556*c* and enters into a threshold area 560 while moving in the direction of display space D 556*d*, the present display space may remain unchanged until the cursor 558 moves out of the threshold area 560 into display space D 556*d*. In other configurations, the computing device 302 may be configured to use a variety of factors in determining whether to determine a new present display space.

Figure 8:
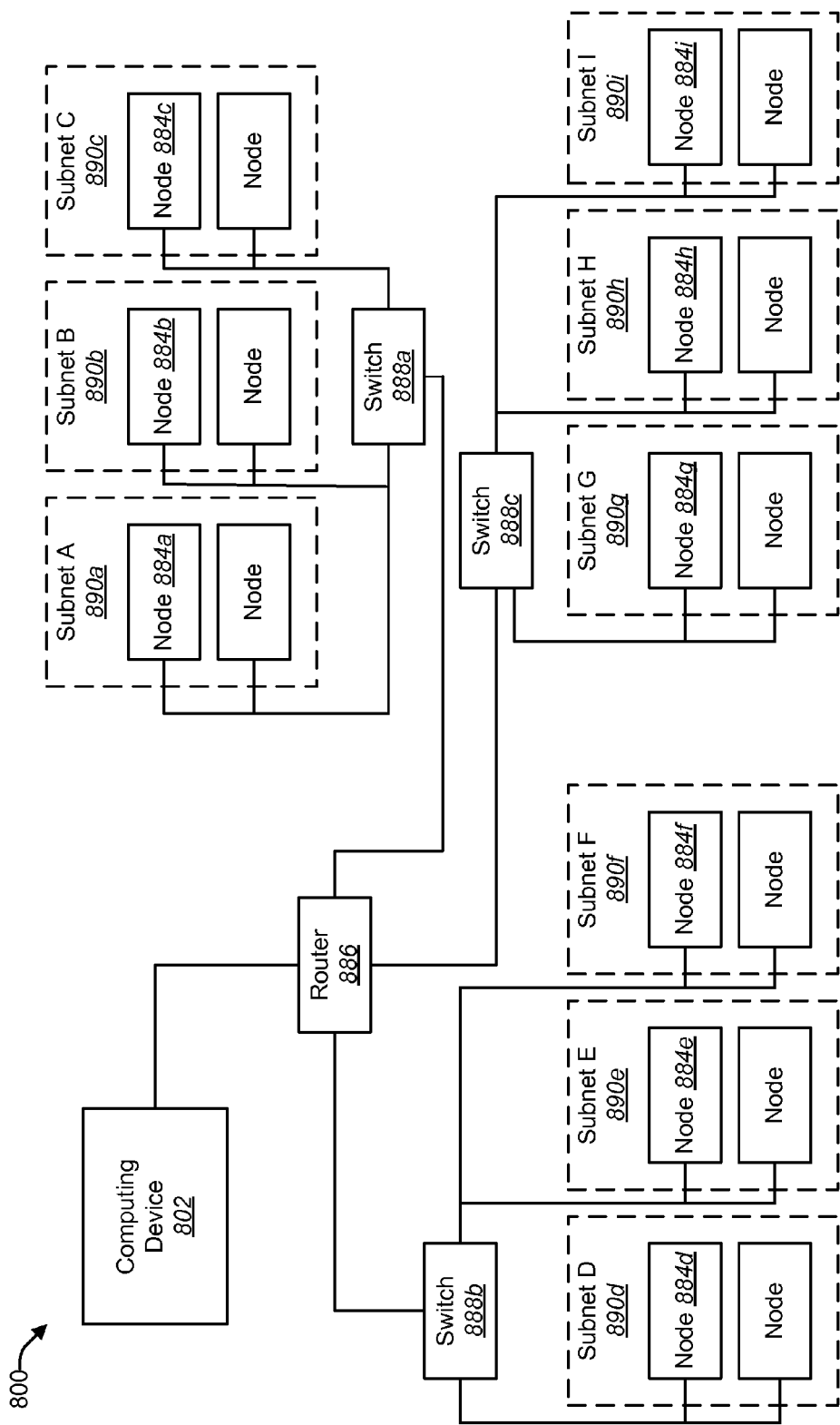
FIG. 8 is a block diagram that illustrates one configuration of a network where a system for a device for displaying a remote display according to a monitor geometry may be implemented.

FIG. 8 is a block diagram that illustrates one configuration of a network where a system for a device for displaying a remote display according to a monitor geometry may be implemented. A computing device 802 is connected to a router 886. The router 886 is connected to switches 888*a*, 888*b*, 888*c*. The switch 888*a* is connected to several nodes 884*a*, 884*b*, 884*c*, etc. via their respective subnets 890*a*, 890*b*, 890*c*. The switch 888*b* is connected to several nodes 884*d*, 884*e*, 884*f*, etc. via their respective subnets 890*d*, 890*e*, 890*f*. The switch 888*c* is connected to several nodes 884*g*, 884*h*, 884*i*, etc. via their respective subnets 890*g*, 890*h*, 890*i*. Although FIG. 8 only shows one router 886, and a limited number of switches 888, subnets 890 and nodes 884, many and varied numbers of routers 886, switches 888, subnets 890 and nodes 884 may be included in networks and/or systems where systems and methods for establishing a direct connection between remote devices may be implemented. One or more of the nodes 884 illustrated in FIG. 8 may be examples of one or more of the nodes 106, 406 described above.

Figure 9:
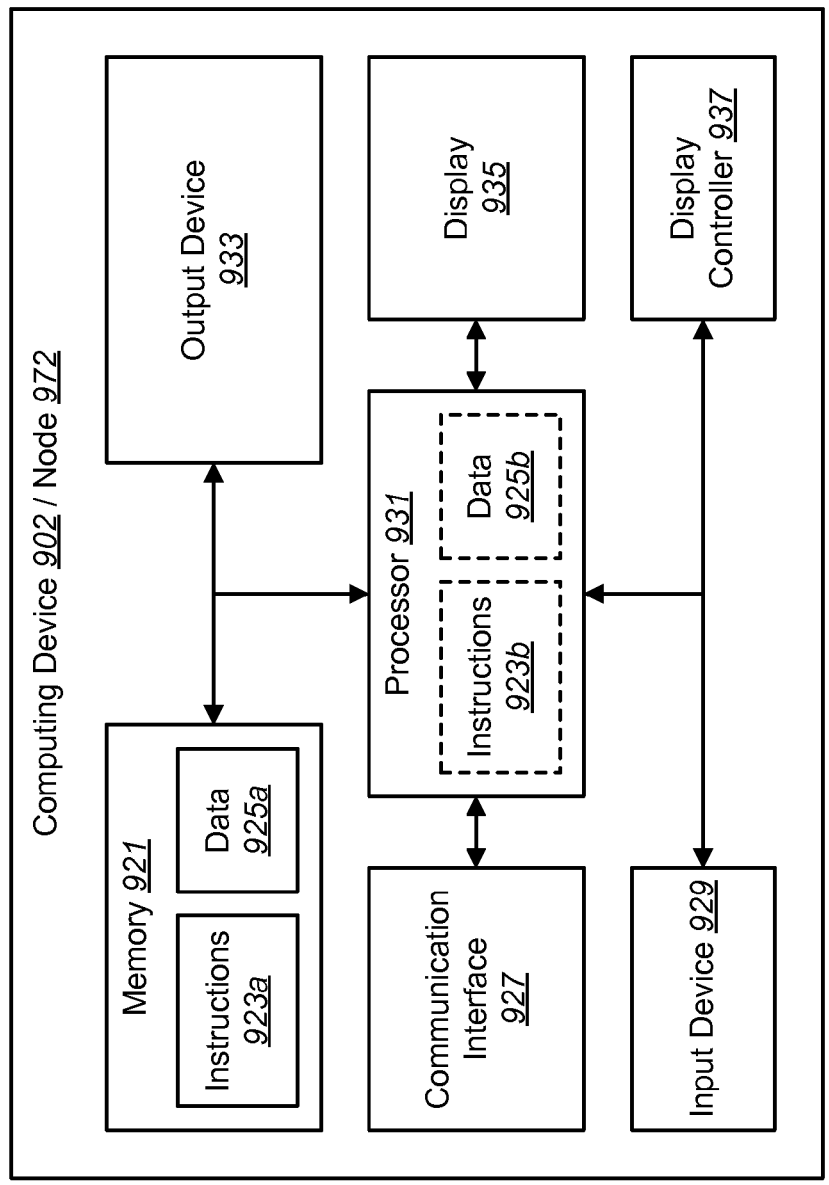
FIG. 9 is a block diagram that illustrates one configuration of a computing device and/or node that may be utilized for displaying a remote display according to a monitor geometry.

FIG. 9 is a block diagram that illustrates one configuration of a computing device 902 and/or node 972 that may be utilized for displaying a remote display according to a monitor geometry. The illustrated components may be located within the same physical structure or in separate housings or structures. One or more of the computing devices 102, 302, 802 and nodes 106, 406, 884 described above may be implemented in accordance with the computing device 902 and/or node 972 illustrated in FIG. 9.

The computing device 902 and/or node 972 may include a processor 931 and memory 921. The memory 921 may include instructions 923*a* and data 925*a*. The processor 931 controls the operation of the administrative system 902 and/or node 972 and may be, for example, a microprocessor, a microcontroller, a digital signal processor (DSP) or other device known in the art. The processor 931 typically performs logical and arithmetic operations based on program instructions 923*b* and/or data 925*b* it loads from the memory 921. The instructions 923*a-b* may be executable by the processor to implement one or more of the methods 200, 600, 700, described above.

The computing device 902 and/or node 972 typically may include one or more communication interfaces 927 for communicating with other electronic devices. The communication interfaces 927 may be based on wired communication technology, wireless communication technology, or both. Examples of different types of communication interfaces 927 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 902 and/or node 972 typically may include one or more input devices 929 and one or more output devices 933. Examples of different kinds of input devices 929 include a keyboard, mouse, microphone, remote control device, button, joystick, trackball, touchpad, lightpen, etc. Examples of different kinds of output devices 933 include a speaker, printer, etc. One specific type of output device that may be typically included in a computer system is a display device 935. Display devices 935 used with configurations disclosed herein may utilize any suitable image projection technology, such as a cathode ray tube (CRT), liquid crystal display (LCD), light-emitting diode (LED), gas plasma, electroluminescence or the like. A display controller 937 may also be provided, for converting data stored in the memory 921 into text, graphics and/or moving images (as appropriate) shown on the display device 935.

Of course, FIG. 9 illustrates only one possible configuration of a computing device 902 and/or node 972. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured to coordinate a remote display, comprising:
    a local display device physically connected to the computing device;
    a processor;
    memory in electronic communication with the processor; and
    instructions stored in memory, the instructions being executable to:
        establish a remote session corresponding to a node, wherein the node is remote from the computing device and is in communication with the node over a network;
        obtain a multi-monitor geometry from the node over the network, wherein the multi-monitor geometry corresponds to two or more remote display devices physically connected to the node, wherein the two or more remote display devices physically connected to the node comprise a first remote display device physically connected to the node and a second remote display device physically connected to the node, and wherein the multi-monitor geometry comprises a physical positioning of the two or more remote display devices indicating whether the first remote display device physically connected to the node and the second remote display device physically connected to the node are placed side-by-side or above or below each other;
        map the multi-monitor geometry to a virtual display space;
        display at least a part of the virtual display space on the local display device based on the multi-monitor geometry that comprises a physical positioning of the two or more remote display devices; and
        display an overlay on the local display device in response to a cursor moving into a threshold area to indicate a potential change in remote display space being displayed.

2. The computing device of claim 1, wherein the multi-monitor geometry comprises a resolution setting of at least one of the two or more remote display devices.

3. The computing device of claim 1, wherein the instructions are further executable to:
    determine a present display corresponding to the two or more remote display devices; and
    map the present display to the virtual display space.

4. The computing device of claim 3, wherein the instructions are further executable to display a portion of the virtual display space corresponding to a present display space.

5. The computing device of claim 3, wherein the instructions are further executable to:
    determine a new present display space based on a change in the present display space;
    map the new present display space to the virtual display space; and
    display a portion of the virtual display space corresponding to the new present display space.

6. The computing device of claim 5, wherein determining a new present display space based on a change in the present display space comprises determining that an indicator on the present display space moves between a first and second display space on the two or more remote display devices.

7. A method for coordinating a remote display, comprising:
    establishing a remote session corresponding to a node, wherein the node is remote from a computing device and is in communication with the node over a network;
    obtaining a multi-monitor geometry from the node over the network, wherein the multi-monitor geometry corresponds to two or more remote display devices physically connected to the node, wherein the two or more remote display devices physically connected to the node comprise a first remote display device physically connected to the node and a second remote display device physically connected to the node, and wherein the multi-monitor geometry comprises a physical positioning of the two or more remote display devices indicating whether the first remote display device physically connected to the node and the second remote display device physically connected to the node are placed side-by-side or above or below each other;
    mapping the multi-monitor geometry to a virtual display space;
    displaying at least a part of the virtual display space on a local display device based on the multi-monitor geometry that comprises a physical positioning of the two or more remote display devices; and displaying an overlay on the local display device in response to a cursor moving into a threshold area to indicate a potential change in remote display space being displayed.

8. The method of claim 7, wherein the multi-monitor geometry comprises a resolution setting of at least one of the two or more remote display devices.

9. The method of claim 7, further comprising:
determining a present display corresponding to the two or more remote display devices; and
mapping the present display to the virtual display space.

10. The method of claim 9, further comprising displaying a portion of the virtual display space corresponding to a present display space.

11. The method of claim 9, further comprising:
determining a new present display space based on a change in the present display space;
mapping the new present display space to the virtual display space; and
displaying a portion of the virtual display space corresponding to the new present display space.

12. The method of claim 11, wherein determining a new present display space based on a change in the present display space comprises determining that an indicator on the present display space moves between a first and second display space on the two or more remote display devices.

13. A non-transitory tangible computer-readable medium for coordinating a remote display comprising executable instructions for:
establishing a remote session corresponding to a node, wherein the node is remote from a computing device and is in communication with the node over a network;
obtaining a multi-monitor geometry from the node over the network, wherein the multi-monitor geometry corresponds to two or more remote display devices physically connected to the node, wherein the two or more remote display devices physically connected to the node comprise a first remote display device physically connected to the node and a second remote display device physically connected to the node, and wherein the multi-monitor geometry comprises a physical positioning of the two or more remote display devices indicating whether the first remote display device physically connected to the node and the second remote display device physically connected to the node are placed side-by-side or above or below each other;
mapping the multi-monitor geometry to a virtual display space;
displaying at least a part of the virtual display space on a local display device based on the multi-monitor geometry that comprises a physical positioning of the two or more remote display devices; and
displaying an overlay on the local display device in response to a cursor moving into a threshold area to indicate a potential change in remote display space being displayed.

14. The non-transitory tangible computer-readable medium of claim 13, wherein the multi-monitor geometry comprises a resolution setting of at least one of the two or more remote display devices.

15. The non-transitory tangible computer-readable medium of claim 13, wherein the executable instructions further comprise:
determining a present display corresponding to the two or more remote display devices; and
mapping the present display to the virtual display space.

16. The non-transitory tangible computer-readable medium of claim 15, wherein the executable instructions further comprise displaying a portion of the virtual display space corresponding to a present display space.

17. The non-transitory tangible computer-readable medium of claim 15, wherein the executable instructions further comprise:
determining a new present display space based on a change in the present display space;
mapping the new present display space to the virtual display space; and
displaying a portion of the virtual display space corresponding to the new present display space.

18. The computing device of claim 1, further comprising instructions being executable to display a user interface that receives user input indicating how to transition between remote display spaces.

* * * * *